United States Patent [19]

Fishbein et al.

[11] 4,041,488

[45] Aug. 9, 1977

[54] DOPPLER RADAR SYSTEM

[75] Inventors: William Fishbein, Elberon; Otto Rittenbach, Neptune, both of N.J.

[73] Assignee: The United States of America as represented by the Department of the Army, Washington, D.C.

[21] Appl. No.: 677,948

[22] Filed: Apr. 19, 1976

[51] Int. Cl.² ............................................. G01S 9/50
[52] U.S. Cl. ........................................ 343/8; 343/9; 343/17.5
[58] Field of Search ................. 343/8, 7 PF, 14, 17.5, 343/9

[56] References Cited

U.S. PATENT DOCUMENTS 2,935,743  5/1960  Glegg ....................................... 343/8
3,149,330  9/1964  Fiocco ..................................... 343/14

Primary Examiner—Maynard R. Wilbur
Assistant Examiner—Lawrence Goodwin
Attorney, Agent, or Firm—Nathan Edelberg; Jeremiah G. Murray; Arthur Boatright

[57] ABSTRACT

A Doppler radar system in which quadrature Doppler signals are derived to yield directional information. The quadrature signals are derived by demodulating the return signals with respective odd and even harmonics of the sinusoidal signal used to frequency modulate the RF carrier.

9 Claims, 3 Drawing Figures

DOPPLER RADAR SYSTEM

GOVERNMENT LICENSE

The invention described herein may be manufactured and used by or for the Government for governmental purposes without the payment of any royalties thereon or therefor.

BACKGROUND OF THE INVENTION a. Field of the Invention

Broadly speaking, this invention relates to radar. More particularly, in a preferred embodiment, this invention relates to a Doppler radar system wherein the direction in which the target is travelling may readily be determined.

b. Discussion of the Prior Art

In many radar applications it is desirable to determine whether a particular target is approaching the antenna or receding from the antenna, that is, whether the target is "incoming" or "outgoing." It is also advantageous if the system can operate incoming targets from outgoing targets, as this ability may be used to yield a significant increase in the signal-to-noise and signal-to-clutter ratios of the system.

The fact that a target is moving may, of course, be determined by Doppler techniques, but to determine the sense of that movement, i.e., whether the target is incoming or outgoing, it is necessary to employ equipment yielding Doppler signals from quadrature RF channels.

In the prior art, such quadrature RF signals have required the use of separate RF demodulators in two, phase-matched RF channels. This makes the system expensive to manufacture and difficult to maintain. Further, if the sytem employs CW transmissions, the leakage between the transmitter and the RF demodulators will upset the phase-balance of the two channels.

SUMMARY OF THE INVENTION

These, and other problems, have been solved by the instant invention which, in a preferred embodiment, comprises a radar system of the type wherein an antenna directs a beam of radio frequency energy at a target, the target reflecting a portion of the beam back towards the antenna. More specifically, the system includes means for generating the radio frequency energy and means for demodulating the beam portion reflected back from the target. The novel system is characterized by means for generating a sinusoidal signal of a first frequency, means for frequency- or phase-modulating the radio frequency generating means with the sinusoidal signal, means for generating odd and even harmonics of the sinusoidal signal and means, connected to the output of the demodulating means and to the output of the harmonic generating means, for developing phase-quadrature Doppler signals from the reflected beam portion.

The invention and its mode of operation will be more fully understood from the following detailed description, when taken with the appended drawings, in which:

DETAILED DESCRIPTION OF THE INVENTION

Figure 1:
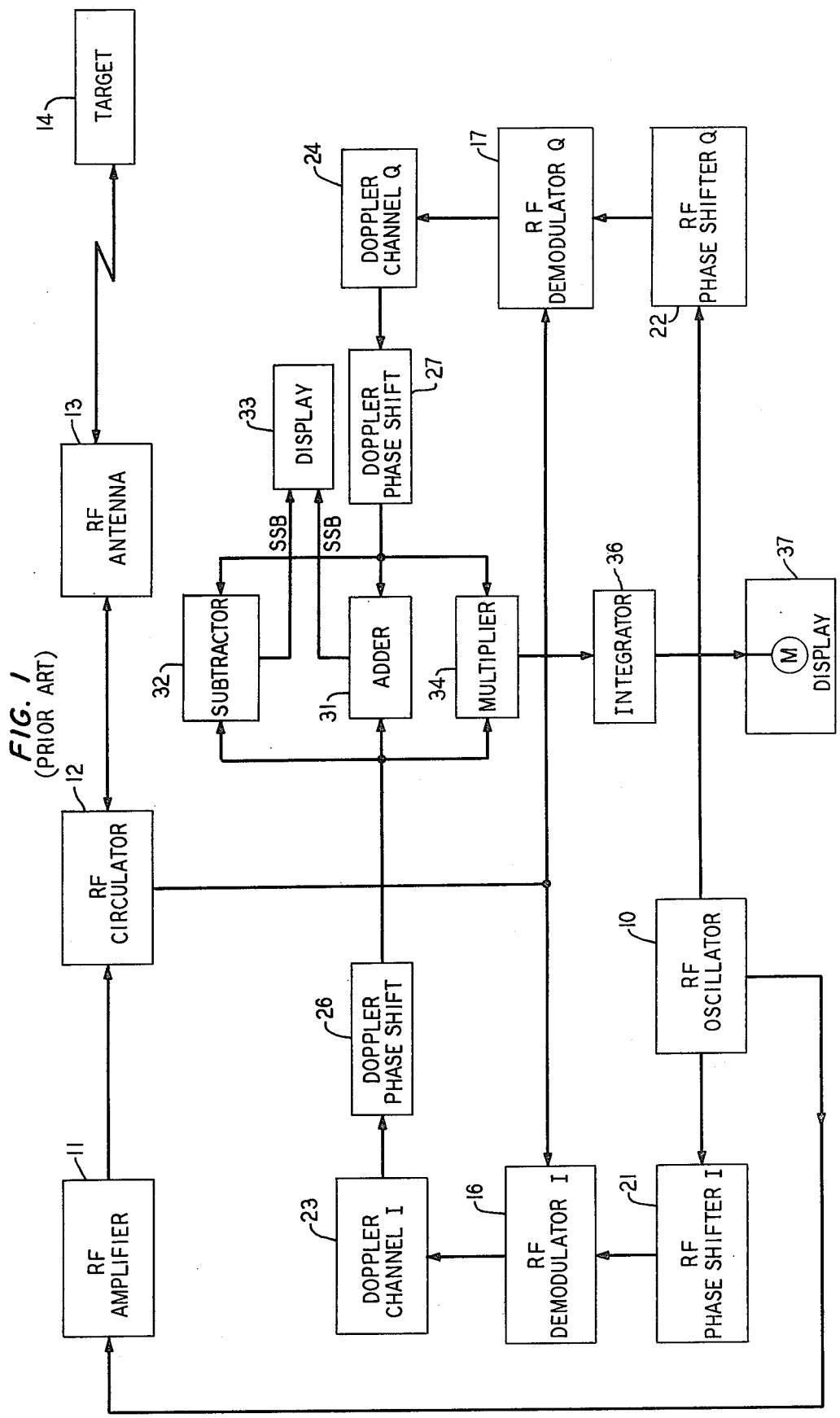
FIG. 1 is a block schematic drawing of a typical prior art radar system.

FIG. 1 depicts a typical, prior art, Doppler radar system. As shown, the output of an RF oscillator 10 is amplified in an RF amplifier 11 and then fed, via an RF circulator 12, to a microwave antenna 13, thence, to the target 14 to be interrogated. The return echo from target 14 is received by antenna 13 and forwarded, via circulator 12, to a pair of phase-matched RF channels, designated the I (in phase) and Q (quadrature) channels, respectively including an RF demodulator 16 and an RF demodulator 17. Both RF demodulators receive the RF output from oscillator 10, but after it has been phase-shifted in RF phase-shifters 21 and 22, respectively. Because the RF input to the demodulators is of the same frequency as that used to interrogate the target, the output of the demodulators, after removing the RF in the Doppler channels, will comprise only the Doppler frequencies present in the return signal; that is to say, the modulation that was impressed on the original interrogating signal by the movement of the target.

As is well known, an ordinary Doppler radar can only determine the fact that a target is moving and its velocity, but the phase-quadrature system shown in FIG. 1 can also sense the direction in which the target is moving by virtue of the quadrature outputs of the two, matched RF channels.

More specifically, the outputs of the I and Q demodulators 16 and 17 are respectively amplified in Doppler channel amplifiers 23 and 24 and phase-shifted in phase-shifters 26 and 27. The combined phase-shift of phase-shift circuits 21 and 22 must, of course, be 90°. Thus, circuits 21 and 22 may respectively have +45° and −45° phase-shifts, or +90° and 0°, et cetera. However, advantageously, phase-shift circuits 26 and 27 have +45° and −45° phase-shifts, respectively.

The outputs from the I and Q phase-shifters 26 and 27, respectively, are then summed in an adder 31, subtracted in a subtractor 32 and displayed as SSB Doppler signals on some suitable display device 33. In view of the fact that most Doppler signals are of low frequency, the two quadrature signals for correlation purposes may be multiplied in multiplier 34 and then integrated in an integrator 36 for subsequent display on some suitable center-zero meter 37.

As previously discussed, the above prior-art approach requires two RF demodulators, two RF phase-shifters and two phase-matched RF channels. The instant invention, depicted in FIG. 2, overcomes these disadvantages. More specifically, in FIG. 2 the output of IF generator 41, $f_{IF}$, illustratively having a frequency of from 10 to 100 KHz, is used to phase- or frequency-modulate a high-power RF generator 42 operating, for example, at 15 GHZ. The CW phase-modulated output from generator 42 is fed, via an RF circulator 43, to an antenna 44 thence to the targets 46.

The return echo from target 46 is fed, via circulator 43, to an RF demodulator 47. Leakage from generator 42 through the circulator 43 also reaches demodulator 47 which, thus, can demodulate the return signal. If target 46 is stationary, the output from demodulator 47 will comprise only harmonics of the IF frequency $f_{IF}$, that is, $0 \times f_{IF}$, $1 \times f_{IF}$, $2 \times f_{IF}$... et cetera. On the other hand, if the target is moving, the output from demodulator 47 will comprise $0 \times f_{IF}+f_D$, $1 \times f_{IF}+f_D$, $2 \times f_{IF}+f_D$ et cetera; where $f_D$ is the Doppler frequency shift, that is, sidebands of the phase-modulated RF carrier modulated by the Doppler frequency.

The output of IF generator 41, at frequency $f_{IF}$, is connected to the input of a harmonic generator 48, the output of which comprises $0 \times f_{IF}$, $1 \times f_{IF}$, $2 \times f_{IF}$... et cetera. An odd IF pass-filter 49 passes only one of the odd IF harmonics, e.g., $1 \times f_{IF}$, $3 \times f_{IF}$, et cetera, while an even IF pass-filter 51 similarly passes only one of the even IF harmonics, $0 \times f_{IF}$, $2 \times f_{IF}$, et cetera. In like fashion, an odd IF bandpass filter 52 passes only one of the odd, Doppler-modulated IF signals $1 \times f_{IF}+f_D$, $3 \times f_{IF}+f_D$... in the output of RF demodulator 47 while an even IF bandpass filter 53 similarly passes only one of the even Doppler-modulated IF signals $0 \times f_{IF}+f_D$, $2 \times f_{IF}+f_D$.... The output of bandpass filters 52 and 53 are respectively connected to the inputs of odd and even IF demodulators 54 and 56 which also receive the outputs of odd or even IF pass-filters 49 and 51, respectively. Odd and even phase-shift circuits 57 and 58 are, however, respectively interconnected between pass-filters 49 and 51 and IF demodulators 54 and 56.

As will be shown in the following mathematical analysis, the demodulation of the even harmonic channel produces an in-phase Doppler signal while the demodulation of the odd harmonic channel produces an out-of-phase (quadrature) Doppler signal.

Figure 2:
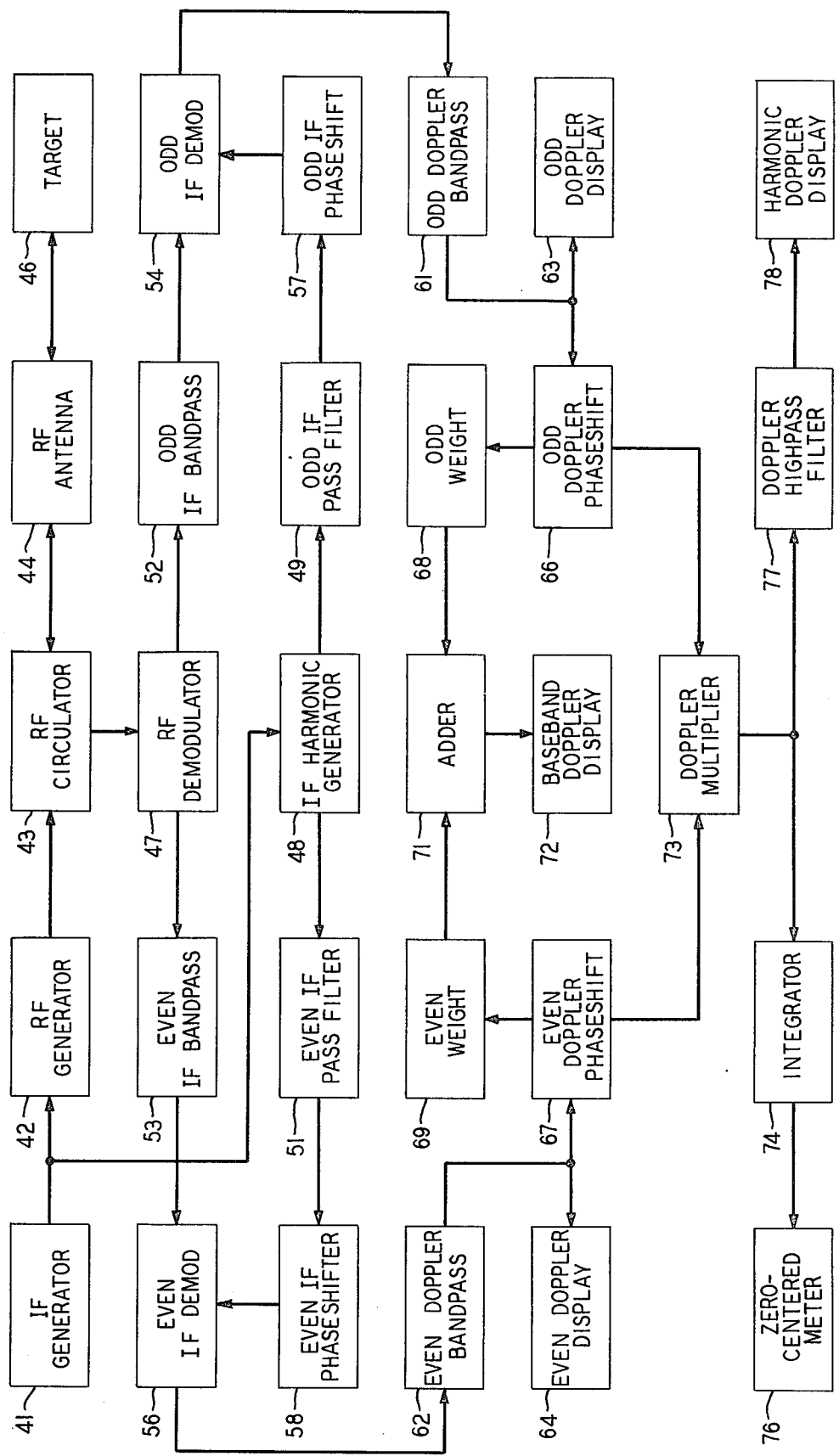
FIG. 2 is a block schematic drawing of the system shown in FIG. 1 when modified according to the instant invention.

In FIG. 2, let the frequency of the RF generator 42 be given by:

$$f(t) = f_o + \Delta f \cos(2\pi f_m t)$$

where
$f_o$ = average transmitter frequency
$\Delta f$ = peak frequency deviation of a transmitter
$f_m$ = modulating frequency.
The output of the generator is then given by:

$$E_o(t) = E \cos\left[2\pi f_o t + \frac{\Delta f}{f_m} \sin(2\pi f_m t)\right]$$

where
$E$ = peak voltage of the generator.
$E_o(t)$ is the signal transmitted over antenna 44. The signal returned from target 46 is given by:

$$KE_o(t - \tau) = KE \cos\left[2\pi f_o(t - \tau) + \frac{\Delta f}{f_m} \sin(2\pi f_m(t - \tau))\right]$$

where
$\tau$ = round trip delay time to target 46; and
$K$ = a factor which accounts for the attenuation of the signal in travelling to the target and back.

Now, some of the transmitted signal leaks through circulator 43 into RF demodulator 47 and provides local oscillator power. The leakage power beats with the reflected target signal and produces a difference frequency output which is given by:

$$E_d(t) = KGE \cos\left[2\pi f_o \tau + \frac{\Delta f}{f_m} \sin(2\pi f_m t) - \frac{\Delta f}{f_m} \sin(2\pi f_m(t - \tau))\right]$$

where
$G$ = conversion loss of the demodulator.
Now, it can be shown that:

$$\sin(2\pi f_m t) - \sin(2\pi f_m(t-\tau)) = 2 \sin(\pi f_m \tau) \cos(2\pi f_m t - \pi f_m \tau).$$

Then $$E_d(t) = KGE \cos\left[2\pi f_o \tau + \frac{2\Delta f}{f_m} \sin(\pi f_m \tau) \cdot \cos(2\pi f_m t - \pi f_m \tau)\right]$$

$$= KGE \cos(2\pi f_o \tau) \cdot \cos\left[\frac{2\Delta f}{f_m} \sin(\pi f_m \tau) \cdot \cos(2\pi f_m t - \pi f_m \tau)\right]$$

$$- KGE \sin(2\pi f_o \tau) \cdot \sin\left[\frac{2\Delta f}{f_m} \sin(\pi f_m \tau) \cdot \cos(2\pi f_m t - \pi f_m \tau)\right]$$

$$= KGE [\cos(2\pi f_o \tau)][J_o(m_f) - 2 J_2(m_f) \cdot \cos(2(2\pi f_m t - \pi f_m \tau))$$

$$+ 2 J_4(m_f) \cdot \cos(4(2\pi f_m t - \pi f_m \tau)) + \ldots]$$

$$- KGE [(\sin(2\pi f_o \tau))][2 J_1(m_f) \cos(2\pi f_m t - \pi f_m \tau)$$

$$- 2 J_3(m_f)\cos(3(2\pi f_m t - \pi f_m \tau)) + \ldots]$$

where $$m_f = \frac{2\Delta f}{f_m} \sin(\pi f_m \tau).$$

If the target moves, the delay time $\tau$ will change to $\tau_o + \dot{\tau} \cdot t$ creating a Doppler phase-shift of $(2\pi f_o \dot{\tau})$ and a Doppler frequency of $f_D = f_o \dot{\tau}$, where $\tau_o$ = the round trip delay at $t = 0$ and $\dot{\tau} = d\tau/dt$. Thus, it has been shown that both an in-phase and an out-of-phase Doppler signal will result.

The multiplication of the demodulated Doppler signals from different sidebands yields range discrimination. For example, if the Doppler signals from the first and second harmonics of the IF signal are multiplied and graphed, a nearly uniform response out to a certain range is noted with a sharp drop in intensity beyond that range. The shape of the range response is controlled by adjusting the modulation index of generator 42, the modulating frequency of generator 41, the particular harmonics processed and the phase of the IF reference signal.

In applications where the fundamental Doppler is too low in frequency to be detected by conventional audio equipment, the second harmonic output of the Doppler correlator can be utilized.

Returning to FIG. 2, the Doppler signals from demodulators 54 and 56 are filtered in odd and even Doppler bandpass filters 61 and 62, respectively, and displayed on odd and even display devices 63 and 64, e.g., earphones or spectrum analyzers. Alternatively, or in addition, they may be phase-shifted in phase-shift circuits 66 and 67, weighted in weighting circuits 68 and 69, respectively, and then summed or subtracted in an adder 71 for display in a suitable baseband Doppler display device 72. The phase-shifted outputs of phase-shifters 66 and 67 may also be multiplied in a multiplier 73, integrated in an integrator 74 to drive a zero-center meter 76 or they may be filtered in a high pass Doppler filter 77 to drive some suitable harmonic Doppler display unit 78.

The above discussion assumed a phase-modulated CW radar signal; however, the invention is not so limited and may also be used with other forms of modulation.

Figure 3:
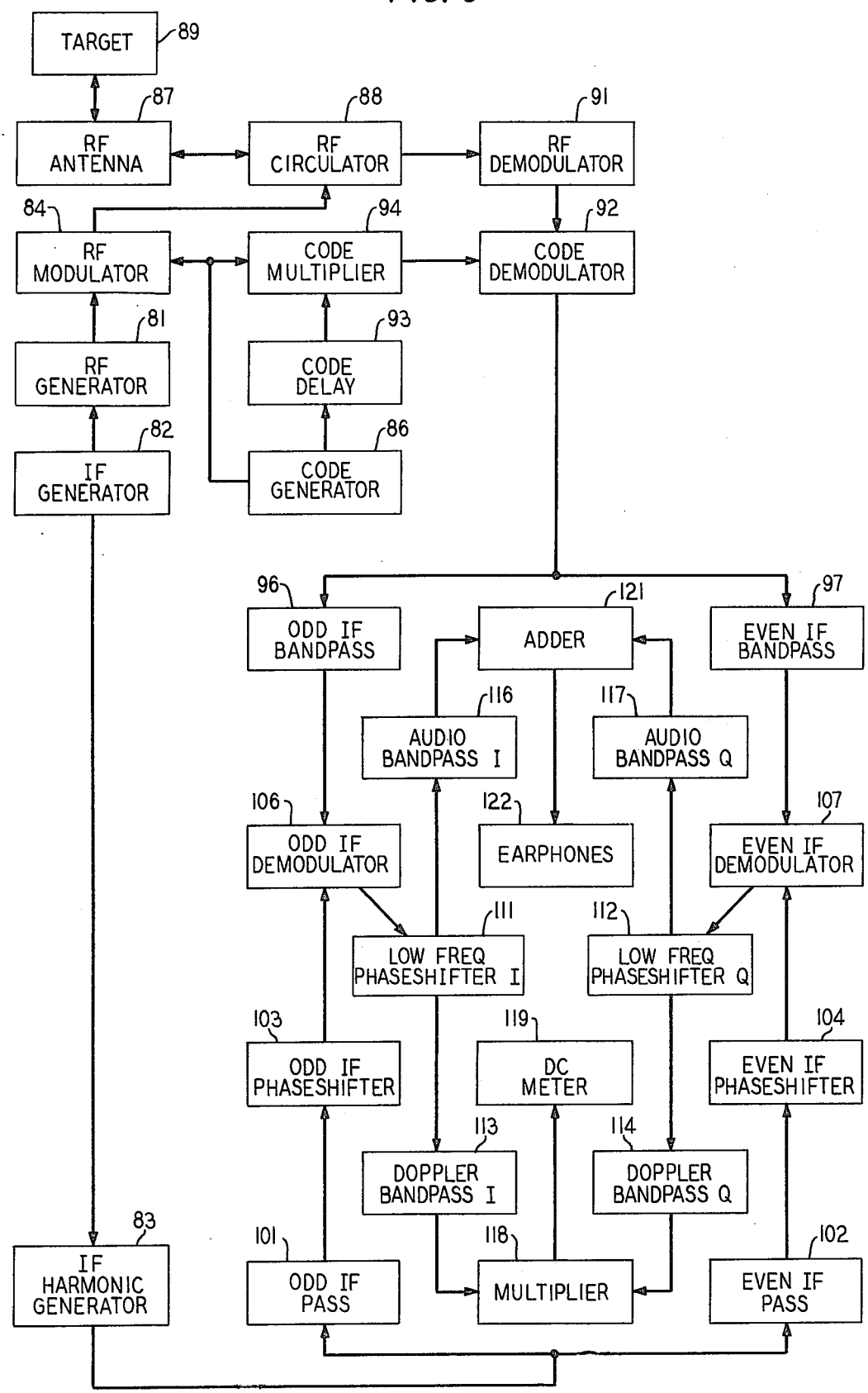
FIG. 3 is a block schematic diagram of another known radar system when modified according to the invention.

For example, as shown in FIG. 3, this invention may also be employed with radar systems of the type that employ sine wave FM modulation combined with pseudo-random modulation, for example, a binary, maximum length code of 127 ($=2^7-1$) elements. More specifically, the output of an RF generator 81 is frequency-modulated by the output of an IF generator 82 having an output frequency $f_{IF}$. The output of IF generator is also fed to an IF harmonic generator 83 which generates the frequencies $1 \times f_{IF}, 2 \times f_{IF}, 3 \times f_{IF}$. . . . The output of RF generator 81 is connected to an RF modulator 84 which receives the output of a code generator 86. Code generator 86 develops a pseudo-random code word, illustratively 7 bits, which changes the phase of the transmitted signal by 180° each time the code changes state, when applied to balanced modulator 84. The output of modulator 84 is connected to the antenna 87, via an RF circulator 88, thence to target 89.

The return signal from target 89 is fed, via antenna 87 and circulator 88, to RF demodulator 91 which also receives, via a leakage path, a signal from modulator 84 to permit the demodulation of the return signal.

The output of RF demodulator 91 is connected to a code demodulator 92 which also receives the code word generated by code generator 86, after delay in circuit 93 and multiplication in multiplier 94. The leakage into demodulator 91 provides a reference for the return echos. The output of the RF demodulator is the product of the transmitted code times the returned code modulated by an FM waveform. The modulation impacted by the mixing of the transmitted and received signals in demodulator 91 is accounted for by multiplying the delayed code by the transmitted code in code multiplier 94. If the code delay is $\tau'$, the output of code demodulator 92 is $$E_s(t) = (E_I - E_Q)u(t-\tau)u(t-\tau').$$

The output of code demodulator 92 is connected to a first IF bandpass circuit 96 which passes frequencies centered about $1 \times f_{IF}$ and also to a second IF bandpass circuit 97 which passes frequencies centered about $2 \times f_{IF}$. The spectrum of $E_s(t)$, above, is the convolution of the code spectrum with harmonics of $f_{IF}$. It can be shown that the spectrum due to frequency modulation is finite ($E_1-E_Q$); thus, if the modulation index is small, $M < 1.5$, we need only consider frequencies up to $3 \times f_{IF}$. Thus, the remainder of the circuitry shown in FIG. 3 is similar to that shown in FIG. 2 except that the only odd harmonic considered is $1 \times f_{IF}$ and the only even harmonic considered is $2 \times f_{IF}$.

More specifically, the outputs of harmonic generator 83 are filtered in bandpass filters 101 and 102, shifted in phase-shifters 103 and 104, respectively, and used to demodulate the outputs of bandpass filters 96 and 97 in IF demodulators 106 and 107, respectively. The resulting Doppler signals are processed in In-phase and quadrature (I and Q) circuits, respectively comprising phase-shifters 111, 112, Doppler bandpass filters 113, 114, and bandpass filters 116, 117. As explained with reference to FIG. 2, the Doppler signals may be multiplied in multiplier 118 for display on meter 119 or summed (or subtracted) in adder 121 for audio display in earphones 122, or the like.

If the output of bandpass filter 96 is $$E_1 = K_1 \sin (2\pi f_o \tau),$$

and the output of bandpass filter 97 is $$E_2 = K_2 \cos (2\pi f_o \tau),$$

where $f_o$ is the frequency of generator 81, then for a moving target where $\tau$ is a function of time, the outputs will be $$E_1 = K_1 \sin (\phi + 2\pi f_D t)$$

$$E_2 = K_2 \cos (\phi + 2\pi f_D t)$$

where
$f_D$ = target Doppler frequency = $f_o \dot{\tau}$ and
$\phi$ = constant phase angle = $2 f_o \tau$.
Dropping $\phi$ in both terms we obtain $$E_1 = K_1 \sin (2\pi f_D t)$$

$$E_2 = K_2 \cos (2\pi f_D t)$$

where $f_D$ is positive if the target is receding and negative if the target is approaching.

The design of phase-shifters 111 and 112 (or phase-shifters 66 and 67 in FIG. 2), is such that over the band of frequencies of interest, the differential phase shift will be 90°. The output of the phase-shifters will now be $$E_1 = \pm K_1 \cos (2\pi f_D t)$$

$$E_2 = K_2 \cos (2\pi f_D t).$$

After $E_1$ and $E_2$ are multiplied in multiplier 118 (or multiplier 73 in FIG. 2), the dc component which drives meter 119 (or meter 76 in FIG. 2) is $$E_{DC} = \pm \tfrac{1}{2} K_1 K_2.$$

One skilled in the art may make various substitutions and changes without departing from the spirit and scope of the invention.

What is claimed is:

1. In a radar system of the type wherein an antenna directs a beam of radio frequency energy at a target, said target reflecting a portion of said beam back towards said antenna, said system including:
  means for generating said radio frequency energy; and
  means for demodulating the beam portion reflected back by said target, the improvement which comprises:
  means for generating a sinusoidal signal of a first frequency;
  means for frequency- or phase-modulating said radio frequency generating means with said sinusoidal signal;
  means for generating odd and even harmonics of said sinusoidal signal of a first frequency;
  means, connected to the output of said demodulating means and to the output of said harmonic generating means, for developing phase-quadrature Doppler signals from said reflected beam portion; and
  said Doppler signal developing means including:
  means, connected to the output of said harmonic generating means, for passing at least one of the even harmonics of said sinusoidal signal;
  means, connected to the output of said harmonic generating means, for passing at least one of the odd harmonics of said sinusoidal signal;
  means, connected to the output of said demodulating means, for passing components of the reflected beam portion centered about said at least one even harmonic of said sinusoidal signal;
  means, connected to the output of said demodulating means, for passing components of the reflected beam portion centered about said at least one odd harmonic of said sinusoidal signal;
  a first Doppler demodulator connected to the output of said even harmonic passing means and to the output of said even component passing means;
  a second Doppler demodulator connected to the output of said odd harmonic passing means and to the output of said odd component passing means; and
  first and second bandpass filters respectively connected to the outputs of said first and second Doppler demodulators for blocking all signal components other than the desired Doppler signals.

2. The system according to claim 1 further including:
  first and second phase-shifting circuits respectively interposed between the output of said odd and even harmonic passing means and said first and second Doppler demodulators.

3. The system according to claim 2 further including:
  means, connected to the outputs of said first and second Doppler bandpass filters, for displaying said phase-quadrature Doppler signals.

4. The system according to claim 2 further including:
  means, connected to the outputs of said first and second Doppler bandpass filters, for shifting the phase of said quadrature Doppler signals;
  means for weighting the amplitudes of said phase-shifted quadrature Doppler signals; and
  means, connected to said weighting means, for summing or subtracting said weighted Doppler signals thereby to generate a baseband Doppler display signal.

5. The system according to claim 2 further including:
  means for multiplying said phase-shifted quadrature Doppler signals; and
  means for filtering the output of said multiplying means to suppress low frequency components thereby to generate a harmonic display signal.

6. The system according to claim 2 further including:
  means for multiplying said phase-shifted quadrature Doppler signals;
  means for integrating the output of said multiplying means; and
  a zero-centered meter connected to the output of said integrating means.

7. In a radar system of the type wherein an antenna directs a beam of radio frequency energy at a target, said target reflecting a portion of said beam back towards said antenna, said system including:
  means for generating said radio frequency energy;
  means for demodulating the beam portion reflected back by said target, the improvement which comprises:
  means for generating a sinusoidal signal of a first frequency;
  means for generating a pseudo-random binary code;
  means for frequency-modulating said radio frequency generating means with said sinusoidal signal;
  means for phase-modulating the output of said frequency-modulating means with the output of said code generating means;
  means, connected to the output of said demodulating means and to the output of said code generating means, for demodulating said reflected beam portion with said pseudo-random code;
  means for generating odd and even harmonics of said sinusoidal signal; and
  means, connected to the output of said code demodulating means and to the output of said harmonic generating means, for developing phase-quadrature Doppler signals from said reflected beam portion.

8. The system according to claim 7 wherein said Doppler signal developing means comprises:
  means, connected to said harmonic generating means, for passing at least one odd harmonic of said sinusoidal signal;
  means, connected to said harmonic generating means for passing only at least one even harmonic of said sinusoidal signal; and
  first and second demodulators, respectively connected to said odd and even harmonic signal passing means and to the output of said code demodulating means for generating said phase-quadrature Doppler signal.

9. The system according to claim 8 further including:
  means, connected to said code generating means, for delaying said pseudo-random code by a fixed amount; and
  means for multiplying said delayed code with said returned signal portion, the output thereof acting as the input to said code demodulating means.

* * * * *